May 17, 1927.

A. MEER

LEVER LOCK

Filed April 8, 1924

1,628,731

Inventor
Alexander Meer

By Herbert E. Smith
Attorney

Patented May 17, 1927.

1,628,731

UNITED STATES PATENT OFFICE.

ALEXANDER MEER, OF SPOKANE, WASHINGTON.

LEVER LOCK.

Application filed April 8, 1924. Serial No. 705,049.

The present invention relates to improvements in lever locks adapted especially for use in connection with the control pedals of an automobile to prevent unauthorized access to and manipulation of the operating parts of such vehicles. The device however is also designed to permit freedom of movement of and not interfere with authorized emergency pushing or towing of an automobile, as required by the traffic regulations of many States.

The primary object of the invention is the provision of a device which is simple in construction and operation, may be manipulated with facility, and which is efficient in the performance of its functions. By the utilization of my invention, the lever or pedal locking device, which is composed of a minimum number of parts, may be manufactured in quantities and at slight cost.

In the accompanying drawings I have illustrated one complete example of the physical embodiment of my invention and a modification thereof, in which the parts are combined and aranged in accordance with the best modes I have thus far devised for the practical application of the principles of my invention.

Figures 1, 2:
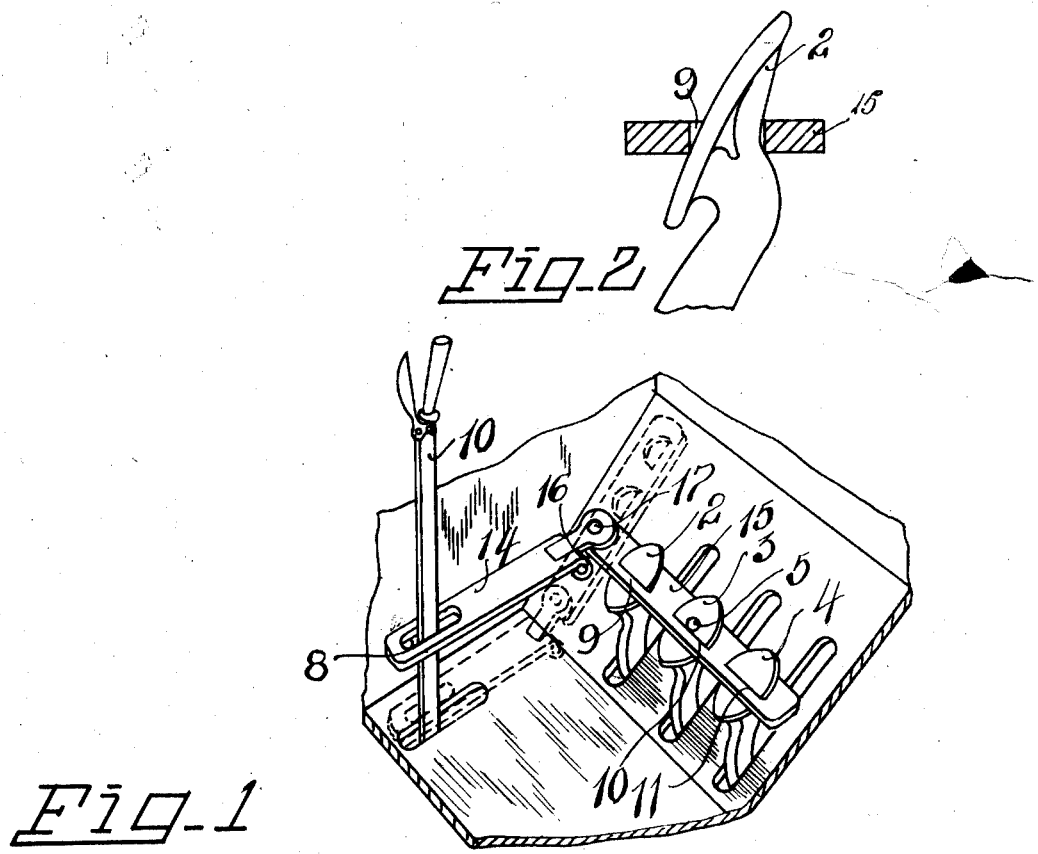
Figure 1 is a perspective view showing the locking device coupled with and locked to the several control devices of the Ford type of car.
Figure 2 is an enlarged sectional detail view showing the relation of the lock bar to a pedal.

In order that the utility of the invention may readily be understood I have illustrated in Figure 1 a portion of an automobile adequate for the purpose of showing the several control members of the Ford type of automobile as the hand lever 10 for brake and clutch, the clutch pedal 2, reverse pedal 3 and brake pedal 4, the lever being in position for manual control and the pedals in position for foot control. These parts are all disposed in predetermined relation, and are not altered except for the provision of a hole or opening 5 in the reverse pedal 3, though it will of course be understood that any other one or all of these pedals may be thus used.

The locking device involves the use of a foldable structure capable of compact arrangement for storage purposes when not in use, and readily adapted for use as in Figure 1.

By means of an elongated opening or slot 8 in the arm 14 the angle bar is permanently carried on the hand lever 10, and from which the angular locking bar cannot be removed except by force. The hand lever thus forms an anchorage for the locking bar whether the latter is in locked position for the control devices or in inoperative position with relation thereto.

As seen in Figure 1 the arm 14 of the angular bar has been elevated from the floor of the automobile and the arm 15 slipped over the pedals with the padlock in use to prevent movement of the pedals, thus rendering inoperative the control devices of the automobile. While in this locked position however, the hand lever 1 may be manipulated should an emergency arise requiring such manipulation.

In Figure 1 the locking device embodies a flexible structure comprising the two arms 14 and 15, the former having the slot 8 and the latter the crescent slots 9, 10 and 11 extending longitudinally of the bar. Between the two arms a double joint is provided as indicated at 16 and 17 in Figure 1, and it will be noted that the pivot or hinge joints are disposed at right angles, permitting the two arms to be swung in planes in order that the arms may be alined and bent at an angle as indicated by dotted lines in Figure 1. Thus when not in use, the arm 14 which is anchored to the hand lever by its slot 8 may lie flat on the floor of the car, and the alined arm 15, bent on the hinge 16 may lie flat on the inclined footboard of the car, leaving the hand lever free for required use and stowing the locking device out of the way of the driver of the car. When the locking device is to be used the slotted arm 14 is elevated, the arm 15 is swung around to the right on its pivot 17 and slipped over the control pedals with the crescent shaped slots in position over the pedals as in Figure 2. A padlock is then applied to the hole 5 in pedal 3 to retain the parts in locked position.

The use of the device of my invention will prevent unauthorized manipulation of the power control devices of the automobile and insure safety against theft of a parked or stored automobile.

Having thus fully described the invention, what is claimed is—

In a lever lock a foldable bar comprising two slotted arms to embrace a lever and pedals, said arms being connected by a pair of hinge joints, the axis of each being perpendicular to the plane of the other, and means in connection with one of said arms for preventing removal of the device from the pedals.

In testimony whereof I affix my signature.

ALEXANDER MEER.